United States Patent
Lee

(10) Patent No.: US 10,759,102 B2
(45) Date of Patent: Sep. 1, 2020

(54) OVERMOLDING DEVICE OF COSMETIC VESSEL

(71) Applicant: SAMHWA P&T CO., LTD., Uiwang-si, Gyeonggi-do (KR)

(72) Inventor: Kyung Chang Lee, Uiwang-si (KR)

(73) Assignee: SAMHWA P&T CO., LTD., Uiwang-si (KR)

(*) Notice: Subject to any disclaimer, the term of this patent is extended or adjusted under 35 U.S.C. 154(b) by 224 days.

(21) Appl. No.: 15/850,441

(22) Filed: Dec. 21, 2017

(65) Prior Publication Data

US 2019/0061220 A1    Feb. 28, 2019

(30) Foreign Application Priority Data

Aug. 30, 2017 (KR) .................. 10-2017-0109769

(51) Int. Cl.
  *B29C 45/72* (2006.01)
  *B29C 45/14* (2006.01)
  *B29L 31/00* (2006.01)
  *B29K 709/08* (2006.01)

(52) U.S. Cl.
  CPC .... *B29C 45/7207* (2013.01); *B29C 45/14434* (2013.01); *B29C 45/14836* (2013.01); *B29K 2709/08* (2013.01); *B29L 2031/718* (2013.01)

(58) Field of Classification Search
  CPC .......... B29C 45/7207; B29C 45/14434; B29C 45/14836; B29K 2709/08; B29L 2031/718
  See application file for complete search history.

(56) References Cited

U.S. PATENT DOCUMENTS

2002/0175136 A1* 11/2002 Bouix .................. A45D 33/18
                                                           215/12.2
2011/0115134 A1*  5/2011 Cotterlaz .......... B29C 45/14836
                                                           264/513

* cited by examiner

*Primary Examiner* — Robert J Grun
(74) *Attorney, Agent, or Firm* — Novick, Kim & Lee, PLLC; Jae Youn Kim

(57) ABSTRACT

Disclosed is an overmolding device of a cosmetic vessel including a cosmetic vessel made of glass, a cooling means for cooling the inside of the cosmetic vessel, and left and right outer molds and overmolding an outer shape of the cosmetic vessel with the cosmetic vessel and the cooling means interposed therebetween. According to the present invention, it is possible to prevent breakage of the vessel due to a molding temperature by cooling the inside of the cosmetic vessel by the cooling means at the time of overmolding of the cosmetic vessel such as a perfume bottle.

1 Claim, 3 Drawing Sheets

OVERMOLDING DEVICE OF COSMETIC VESSEL

CROSS-REFERENCE TO RELATED APPLICATION

This application claims under 35 U.S.C. § 119(a) the benefit of Korean Patent Application No. 10-2017-0109769 filed on, the entire contents of which are incorporated herein by reference.

BACKGROUND

(a) Technical Field

The present invention relates to an overmolding device of a cosmetic vessel and more particularly, to an over molding device of a cosmetic vessel to prevent damage to the vessel by a molding temperature when overmolding the cosmetic vessel such as a perfume bottle.

(b) Background Art

Overmolding or multi-component molding has been widely used in an injection molding industry. The overmolding is basically limited to a process of producing a completed component having two or more thermoplastic base resins by injection molding. A method in the case of two overmolding components is known as bi-injection molding. The overmolding has been used in a cable industry for many years and it has been found that interest in the overmolding is increasing in an industrial field and a consumer product industry. In these industries, many applications combine soft touch materials into rigid components. The soft touch material provides an improved appearance, a good contact property, and an improved gripping capability. The most widely used method for combining the soft material and the rigid material is overmolding on the surface of a finished product such as a vessel.

Traditionally, direct overmolding of the soft material on the rigid material forms a finished product part. It is preferable to provide a technique of applying the soft touch material on the rigid vessel at the time of producing the vessel. This is a part of the present invention. An overmolded layer is applied to a vessel perform which is a part of the exterior of the vessel after the overmolded layer is blow-molded.

A significant improvement of the gripping capability may be achieved with a combination of an improved grip design on the vessel and overmolding of the grip design area that enhances the grip of the vessel. An object of the present invention is to improve gripping of a vessel by improving a grip portion formed in the vessel as an integrated part of the vessel. It is especially important for a vessel for a personal health care product in which an outer surface of the vessel and the personal hand may have soap layers in addition to the vessel and the personal wet hand. The soap is a well-known lubricant. The forming of the grip portion on the vessel and the overmolding of the grip portion of the vessel significantly reduce the drop of the vessel which has been used in a humid environment. This is an effect of the combination of the grip portion on the vessel and the overmolded material.

Accordingly, in a packaging industry, in order to form a vessel having an improved gripping function and/or other different functions, it is also required to achieve the design characteristic without adversely affecting PET or other thermoplastic recycling steams. Further, in the packaging industry, it is required to produce an effective vessel in terms of costs.

SUMMARY OF THE DISCLOSURE

The present invention has been made in an effort to provide an overmolding device for a cosmetic vessel which prevents breakage of the vessel due to a molding temperature at the time of overmolding of the cosmetic vessel such as a perfume bottle.

A first exemplary embodiment of the present invention provides an overmolding device of a cosmetic vessel including a cosmetic vessel made of glass, a cooling means for cooling the inside of the cosmetic vessel, and left and right outer molds for overmolding an outer shape of the cosmetic vessel with the cosmetic vessel and the cooling means interposed therebetween.

The cooling means may include a cylindrical support mold having an upper surface opened at a lower portion of the left and right outer molds and a lower hole formed at the center of a lower surface, an interior material having a communication hole communicating with the lower hole of the support mold at the center as a stretchable material having heat resistance at a melting temperature or more of a molten resin which is inserted into the cylindrical support mold, and a cylindrical hollow protrusion which protrudes from the top of the communication hole of the interior material and has a plurality of cooling holes formed on the outer periphery and the upper surface.

A seating groove into which a bottleneck portion of the cosmetic vessel is inserted may be formed below the outer periphery of the cylindrical hollow protrusion.

According to the overmolding device of the cosmetic vessel of the present invention, it is possible to prevent breakage of the vessel due to a molding temperature by cooling the inside of the cosmetic vessel by the cooling means at the time of overmolding of the cosmetic vessel such as a perfume bottle.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Figure 1:
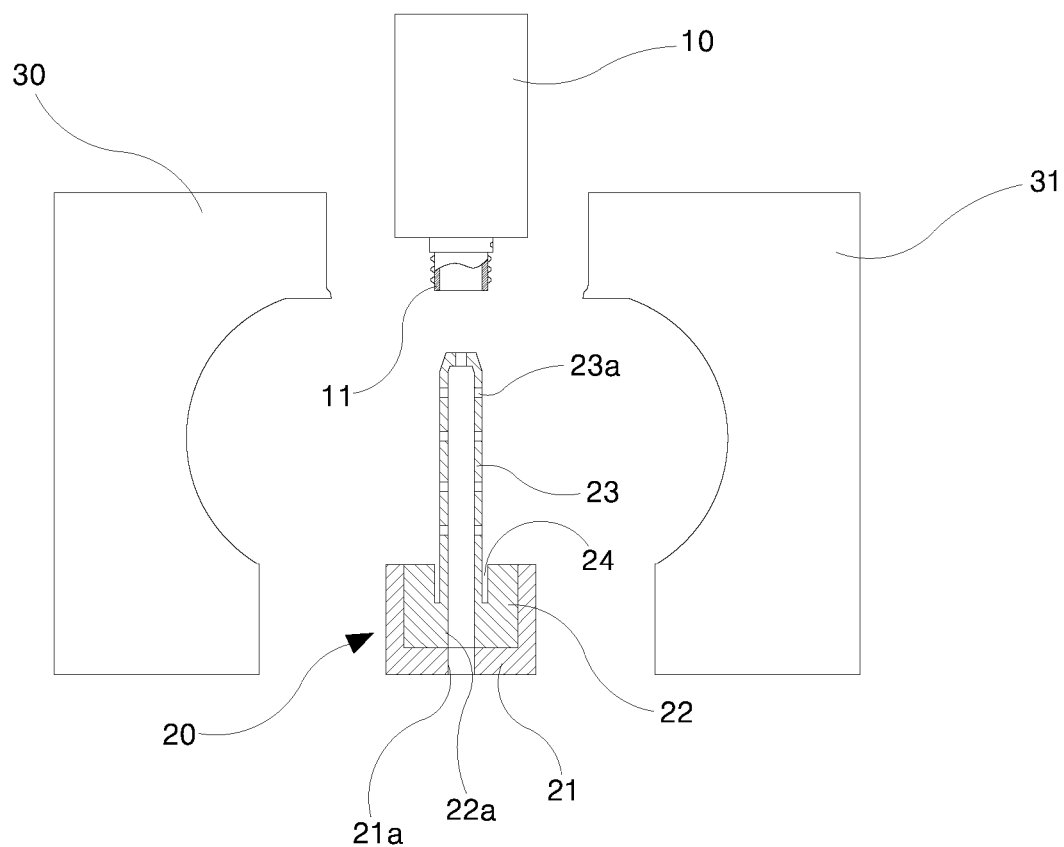
FIG. 1 is a cross-section view illustrating an overmolding device of a cosmetic vessel of the present invention.

Hereinafter, a preferred embodiment of the present invention will be described hereinafter with reference to the accompanying drawings so that those skilled in the art easy implement the preferred embodiment of the present invention. It should be noted that reference numerals denoted in configurations in the accompanying drawings use like reference numerals as possible when denoting like configurations even in other drawings. Further, in describing the present invention, detailed description of associated known function or constitutions will be omitted if it is determined that they unnecessarily make the gist of the present invention unclear. In addition, any features shown in the drawings are enlarged, reduced, or simplified for ease of description and the drawings and constituent elements thereof are not necessarily illustrated at appropriate ratios. However, these details will be easily understood to those skilled in the art.

Terms including an ordinary number, such as first and second, are used for describing various constituent elements, but the constituent elements are not limited by the terms. The terms are used only to discriminate one constituent element from another component. The terms are used only to discriminate one constituent element from another component. The term 'and/or' includes a combination of a plurality of associated disclosed items or any item of the plurality of associated disclosed items.

Further, relative terms described based on those illustrated in the drawings such as 'front surface', 'rear surface', 'upper surface' and 'lower surface' may be replaced with ordinals such as 'first' and 'second'.

In the ordinals such as 'first' and 'second', the order may be an aforementioned order or arbitrarily defined, and the order may be arbitrarily changed if necessary.

Terms used in the present application are used only to describe specific exemplary embodiments, and are not intended to limit the present invention. A singular form may include a plural form if there is no clearly opposite meaning in the context. In the present application, it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

If it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present application.

Hereinafter, a preferable embodiment of the present invention will be described in detail with reference to the accompanying drawings. Moreover, in the following description, a detailed explanation of related known configurations or functions may be omitted to avoid obscuring the subject matter of the present invention.

Figure 2:
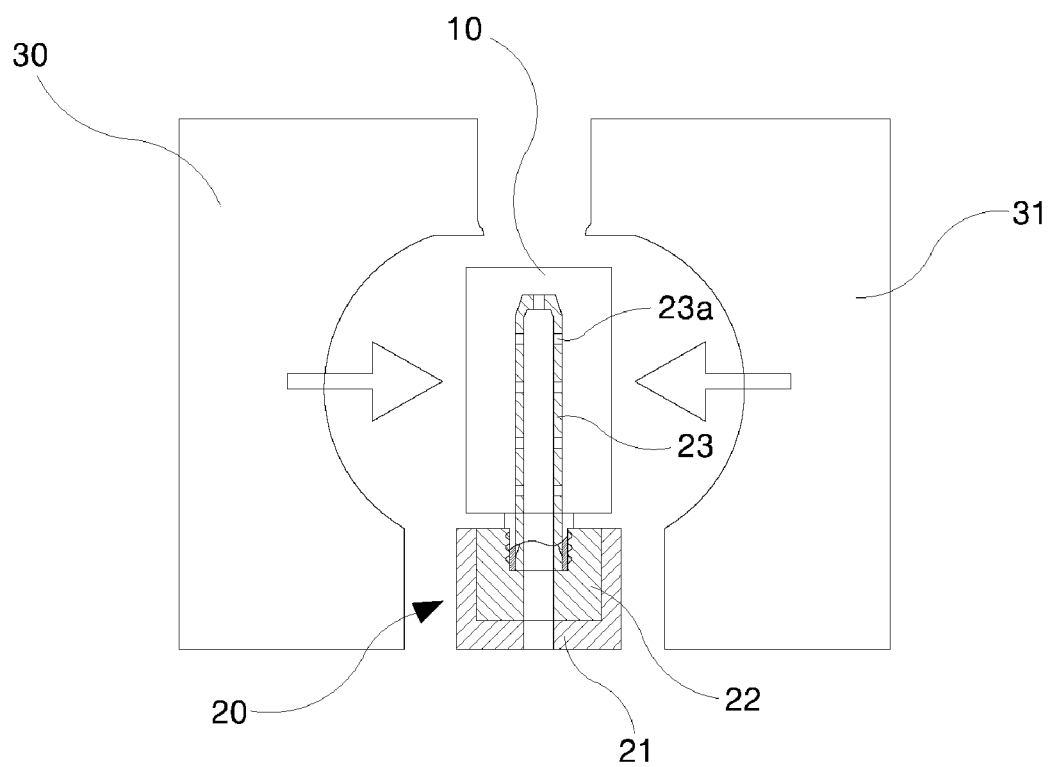
FIG. 2 is a cross-section view illustrating an overmolding process of a cosmetic vessel of the present invention.
Figure 3:
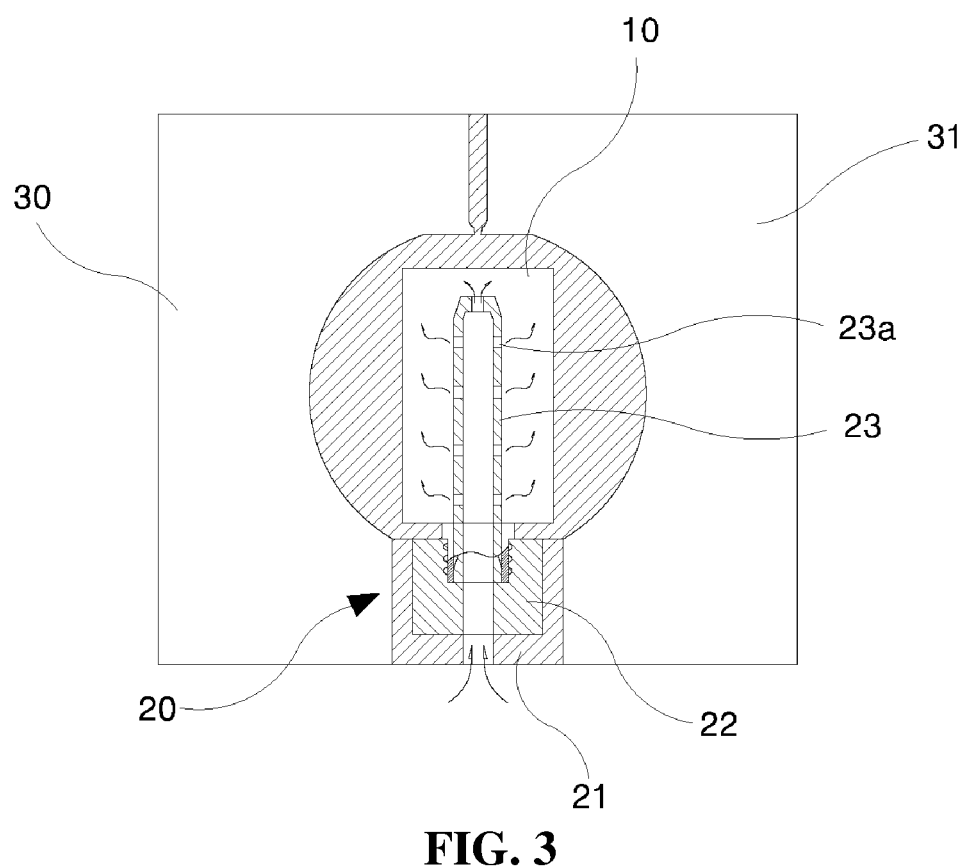
FIG. 3 is a cross-section view illustrating a cooling device at the time of overmolding of the cosmetic vessel of the present invention.

FIG. 1 is a cross-section view illustrating an overmolding device of a cosmetic vessel of the present invention, FIG. 2 is a cross-section view illustrating an overmolding process of a cosmetic vessel of the present invention, and FIG. 3 is a cross-section view illustrating a cooling device at the time of overmolding of the cosmetic vessel of the present invention.

As illustrated in FIGS. 1 to 3, an overmolding device of a cosmetic vessel of the present invention includes a cosmetic vessel 10 made of glass, a cooling means 20 for cooling the inside of the cosmetic vessel 10, and left and right outer molds 30 and 31 for overmolding an outer shape of the cosmetic vessel 10 with the cosmetic vessel 10 and the cooling means 20 interposed therebetween.

The cooling means 20 includes a cylindrical support mold 21 having an upper surface opened at a lower portion of the left and right outer molds 30 and 31 and a lower hole 21a formed at the center of a lower surface, an interior material 22 having a communication hole 22a communicating with the lower hole 21a of the support mold 21 at the center as a stretchable material having heat resistance at a melting temperature or more of a molten resin which is inserted into the cylindrical support mold 21, and a cylindrical hollow protrusion 23 which protrudes from the top of the communication hole 22a of the interior material 22 and has a plurality of cooling holes 23a formed on the outer periphery and the upper surface.

A seating groove 24 into which a bottleneck portion 11 of the cosmetic vessel 10 is inserted is formed below the outer periphery of the cylindrical hollow protrusion 23.

Next, the operation and effect of the overmolding device of the cosmetic vessel of the present invention configured as described above will be described.

First, when the bottleneck portion 11 is directed downward by overturning the cosmetic vessel 10 made of glass to be inserted into the seating groove 24 of the cooling means 20, the cylindrical hollow protrusion 23 is inserted to the inside of the cosmetic vessel 10.

As described above, the cooling means 20 and the cosmetic vessel 10 are covered by the left and right outer molds 30 and 31 while being coupled to each other. The left and right outer molds 30 and 31 are symmetrical to each other and grooves are formed along the outer shape of the cosmetic vessel 10.

An insert material is injected through insert holes formed by upper facing portions of the left and right outer molds 30 and 31.

As such, when the insert material, that is, a molten resin is injected, the cosmetic vessel 10 made of glass is broken by a molding temperature of the insert material. Accordingly, in order to prevent the breakage, cooling gas is injected through the lower hole 21a formed below the support mold 21 to be discharged to the plurality of cooling holes 23a formed in the cylindrical hollow protrusion 23.

The discharged cooling gas lowers a temperature of the insert material in the cosmetic vessel 10 to prevent breakage of the cosmetic vessel 10.

As described above, detailed embodiments have been described in the detailed description of the present invention, but a possibility that the technology of the present invention will be easily modified and executed by those skilled in the art is apparent and the modified embodiments will be included in the technical spirit disclosed in the appended claims of the present invention.

What is claimed is:

1. An overmolding device of a cosmetic vessel, comprising:
　a cosmetic vessel made of glass;
　a cooler for cooling an inside of the cosmetic vessel; and
　left and right outer molds for overmolding an outer shape of the cosmetic vessel and the cooler interposed between the left and right outer molds,
　wherein the cooler includes:
　a cylindrical support mold having an upper surface opened at a lower portion of the left and right outer molds and a lower hole disposed at a center of a lower surface thereof;
　an interior material having a communication hole a communicating with the lower hole of the cylindrical support mold at the center and having heat resistance at a melting temperature or more of a molten resin, the interior material being inserted into the cylindrical support mold; and a cylindrical hollow protrusion which protrudes from a top of the communication hole of the interior material and has a plurality of cooling holes disposed on an outer side surface and an upper surface thereof, wherein the interior material has a seating groove into which a bottleneck portion of the cosmetic vessel is inserted, the seating grooves being disposed below the plurality of cooling holes, wherein the overmolding device further comprises an injection hole disposed on an upper end thereof and formed by the left and right outer molds, and wherein, when the molten resin is injected through the injection hole, in order to prevent breakage of the cosmetic vessel, cooling gas is injected through the lower hole and discharged through the plurality of cooling holes, the discharged cooling gas lowers a temperature of the molten resin to prevent breakage of the cosmetic vessel.

\* \* \* \* \*